(12) United States Patent
Le Paih

(10) Patent No.: US 7,217,117 B2
(45) Date of Patent: May 15, 2007

(54) DEVICES FOR SHAPING PORTIONS OF MINCED MEAT SUCH AS STEAKS, MEATBALLS ETC.

(75) Inventor: Jacques Le Paih, Plumeliau (FR)

(73) Assignee: Nijal S.A., Baud (FR)

( * ) Notice: Subject to any disclaimer, the term of this patent is extended or adjusted under 35 U.S.C. 154(b) by 596 days.

(21) Appl. No.: 10/482,084

(22) PCT Filed: Jun. 19, 2002

(86) PCT No.: PCT/FR02/02105

§ 371 (c)(1),
(2), (4) Date: Dec. 22, 2003

(87) PCT Pub. No.: WO03/001918

PCT Pub. Date: Jan. 9, 2003

(65) Prior Publication Data

US 2004/0155129 A1 Aug. 12, 2004

(30) Foreign Application Priority Data

Jun. 22, 2001 (FR) .................................. 01 08238
Feb. 25, 2002 (FR) .................................. 02 02334

(51) Int. Cl.
*A23L 1/00* (2006.01)
(52) U.S. Cl. ........................ 425/377; 99/353; 99/537; 425/236; 425/556

(58) Field of Classification Search ............... 99/339, 99/340, 352–355, 386, 443 R, 443 C, 444–450, 99/537, 538; 100/41, 101, 151, 222; 425/236, 425/237, 195, 352–355, 113, 377, 356, 382.3, 425/30, 35

See application file for complete search history.

(56) References Cited

U.S. PATENT DOCUMENTS

| | | | |
|---|---|---|---|
| 2,275,780 A | 3/1942 | Maloney | |
| 2,542,673 A | 2/1951 | Hedwall | |
| 2,580,008 A | 12/1951 | Elsaesser | |
| 2,657,423 A | 11/1953 | Elsaesser | |
| 3,714,888 A * | 2/1973 | Tanguy et al. | 99/355 |
| 4,104,958 A * | 8/1978 | Manser et al. | 99/355 |
| 4,257,145 A | 3/1981 | Bovino | |
| 4,516,291 A | 5/1985 | Goldberger et al. | |

(Continued)

FOREIGN PATENT DOCUMENTS

EP 0 528 575 A 2/1993

(Continued)

OTHER PUBLICATIONS

Translated Japanese office action to which the present application claims priority, dated Dec. 2006.

*Primary Examiner*—Timothy F. Simone
(74) *Attorney, Agent, or Firm*—Harness, Dickey & Pierce, P.L.C.

(57) ABSTRACT

The invention relates to arrangements comprising combinations of: a mincer providing a stream of minced meat (V); conveying means with an endless band (T) for transporting the stream (V), exiting from said mincer; and, arranged along said conveyor means (T): means for cutting the stream (V) into portions (P) and means for lateral shaping (/), acting simultaneously on both sides of the stream (V) to shape the contour of the portions (P).

18 Claims, 9 Drawing Sheets

U.S. PATENT DOCUMENTS

| | | |
|---|---|---|
| 4,630,426 A | 12/1986 | Gentry |
| 4,886,441 A | 12/1989 | Lortz |
| 5,048,405 A * | 9/1991 | Takahashi et al. ............ 99/470 |
| 5,564,329 A * | 10/1996 | Tomimatsu .................. 99/334 |
| 5,953,984 A * | 9/1999 | Moessmer et al. ............ 99/494 |
| 6,039,991 A * | 3/2000 | Ruozi ......................... 426/241 |
| 6,299,085 B1 * | 10/2001 | Ekstrom .................. 241/282.1 |
| 6,606,939 B1 * | 8/2003 | Tateno ......................... 99/510 |

FOREIGN PATENT DOCUMENTS

| | | |
|---|---|---|
| FR | 2 718 612 A | 10/1995 |
| JP | 6221880 | 2/1987 |

* cited by examiner

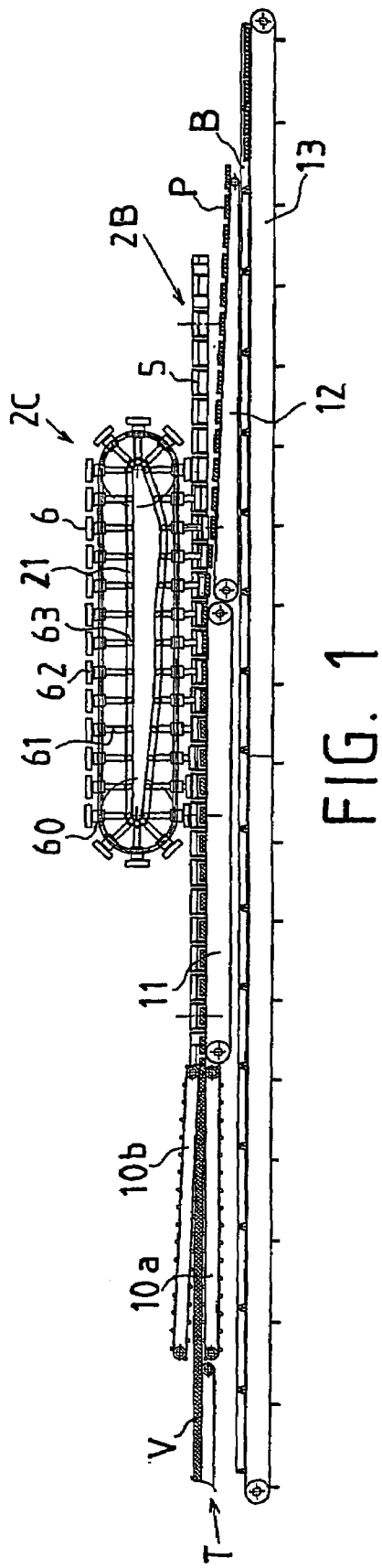
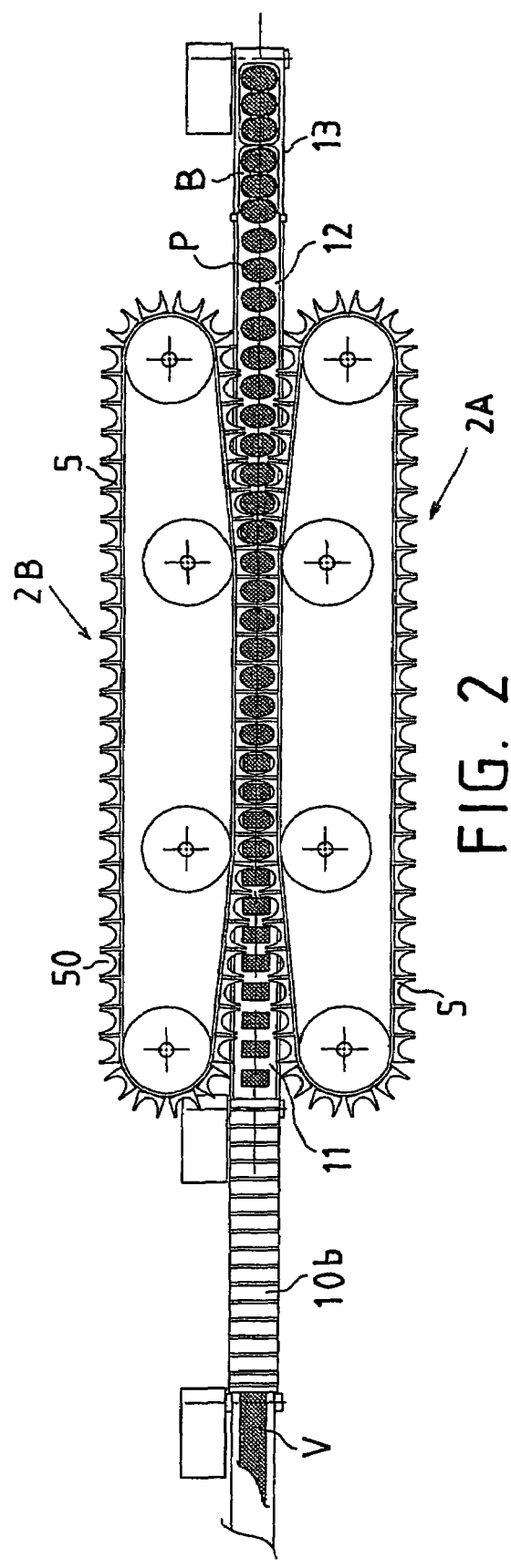

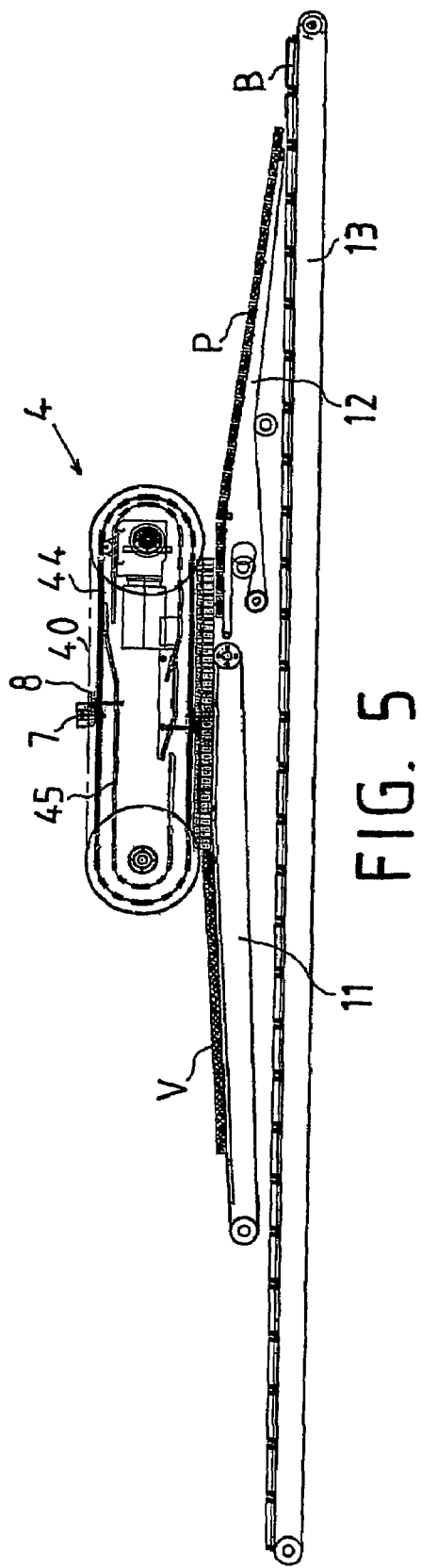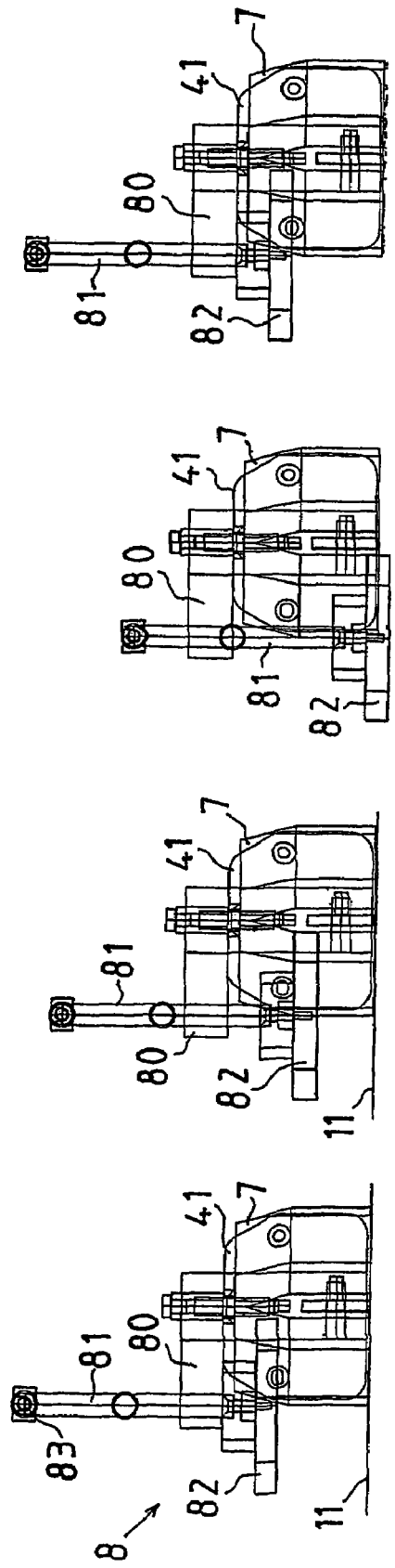

DEVICES FOR SHAPING PORTIONS OF MINCED MEAT SUCH AS STEAKS, MEATBALLS ETC.

CROSS-REFERENCE TO RELATED APPLICATIONS

This application is a National Stage of International Application No. PCT/FR02/02105, filed Jun. 19, 2002. The disclosure of the above application is incorporated herein by reference.

BACKGROUND OF THE INVENTION

1. Field of the Invention

The present invention relates to devices for shaping portions of minced meat which can have various shapes, concerning for example reconstituted steaks, standard hamburger steaks, meatballs etc.

2. Description of Related Art

Nowadays, industrially made products of this type are essentially minced meat steaks. During manufacture, the meat issuing from the mincing machine is stored in a hopper, and taken from the bottom of the latter to be introduced under pressure into a chamber with a shaping tray as a base. Since the pressure required for shaping has to be high, the forces acting on the meat in a haphazard manner are very detrimental to the internal structure of the latter. The result is steaks with compact texture, more or less granular, and dry because they have released a lot of exudates.

These products are therefore mediocre in quality, compared to minced steaks prepared in the quality, compared to minced steaks prepared in the traditional way, where the meat exiting from the grid of the mincing machine in threads called "angel hairs" has only been slightly compacted without damaging this thread structure, so well that it retains a relatively light and soft texture together with a maximum of flavor.

BRIEF SUMMARY OF THE INVENTION

The invention has been designed for industrial production of high quality minced meat steaks comparable to those of minced meat steaks prepared in the traditional way.

The invention is also aimed at industrial production of portions of minced meat of shapes different from those of minced meat steaks, such as meatballs, for example.

Another aim within the scope of the invention is to enable production of portions of minced meat of various shapes with a single machine, needing only practical and quick operational modifications to pass from one shape to another.

The invention consists of a device for manufacturing shaped portions of minced meat, such as steaks or meatballs, characterised in that it comprises:

a mincing machine providing a stream of minced meat, said stream of minced meat having a size determined in function of the portions to be produced;
  conveying means with an endless belt, for transporting said stream of minced meat exiting from said mincing machine,
  means for cutting said stream of minced meat into portions; and
  lateral shaping means acting simultaneously on both sides of said stream of minced meat to shape the contour of said portions.

In order to apply minced steak type shaping of portions, the device furthermore includes vertical shaping means co-operating with said lateral shaping means to give the portions the chosen thickness.

Since the stream of minced meat is shaped slightly wider and thicker than the final products, the shaping only involves forces that all act closely perpendicular to the orientation of the threads of meat exiting from the meat-mincing machine. This means that the shaping essentially has only a moderate compacting effect rather than a crushing effect, and does not break the thread structure of the meat and which therefore seems very close to the traditional shaping method while still maintaining all the advantages.

Said means for cutting said stream of minced meat into portions can be set upstream said shaping means, consisting for example of a passage for said stream of minced meat formed by two endless belts with superposed transversal cleats, that approach each other vertically from upstream to downstream, in such a way that said cleats tighten progressively two by two on said stream of minced meat by pinching it until it is cut. In a preferred embodiment of the invention, the cutting into portions of said stream is carried out at the same time as shaping.

According to the invention, said lateral shaping means can be indented or recessed blocks advancing symmetrically on each side and immediately above a transporting belt for shaping, being part of said transporting means of said stream of minced meat, so that from upstream to downstream they approach each other in order to touch and with their indents or recesses form shaping cavities with said transporting belt. If the device also comprises said vertical shaping means, the latter can then be pushers above said shaping transporting belt, between said lateral shaping blocks, advancing with them in a synchronised way.

In an embodiment of the invention, said lateral shaping blocks are mounted on first and second endless loop arrangements set horizontally and symmetrically on each side of said transporting shaping belt and advancing with it in a synchronised way. If pushers are provided to co-operate with said lateral shaping blocks, they can then be mounted on a third endless loop arrangement set above said shaping transporting belt and between said first and second endless loop arrangements, and advancing with them in a synchronised way.

In a variant of an embodiment according to the invention, said lateral shaping blocks, possibly with said pushers, are mounted in an identical endless loop arrangement set above said shaping transporting belt, said endless loop arrangement comprising two identical lateral endless chains in parallel carrying transversal runners upon which said lateral shaping blocks are mounted in a sliding manner. In this variant, said lateral shaping blocks can have a central indent or recess in order to co-operate two by two, but in a preferred embodiment they each have two indents or recesses on either side of a part with central separation, in such a way that the shaping cavities are each formed between two consecutive facing pairs of lateral shaping blocks, said stream of minced meat then being able to be cut into portions during shaping, by the sliding runners of said lateral shaping blocks.

Advantageously, according to another characteristic of the invention, said pushers constituting the vertical shaping means have a supplementary run to evacuate the portions positively after shaping.

BRIEF DESCRIPTION OF THE DRAWINGS

These characteristics and advantages of the invention, together with others, will be understood more clearly from the following description and the attached drawings, in which:

FIG. 1 is a diagrammatic side view of a first form of embodiment of a device according to the invention for producing minced meat steaks;

FIG. 2 is a diagrammatic top view of part of the device of FIG. 1;

FIG. 5 is a diagrammatic side view of another form of preferred embodiment of the device according to the invention for producing steaks of minced meat;

FIGS. 9a to 9d are diagrammatic views showing the different movements of the pushers of the device in FIGS. 5 to 8;

DETAILED DESCRIPTION OF THE INVENTION

Figure 3:
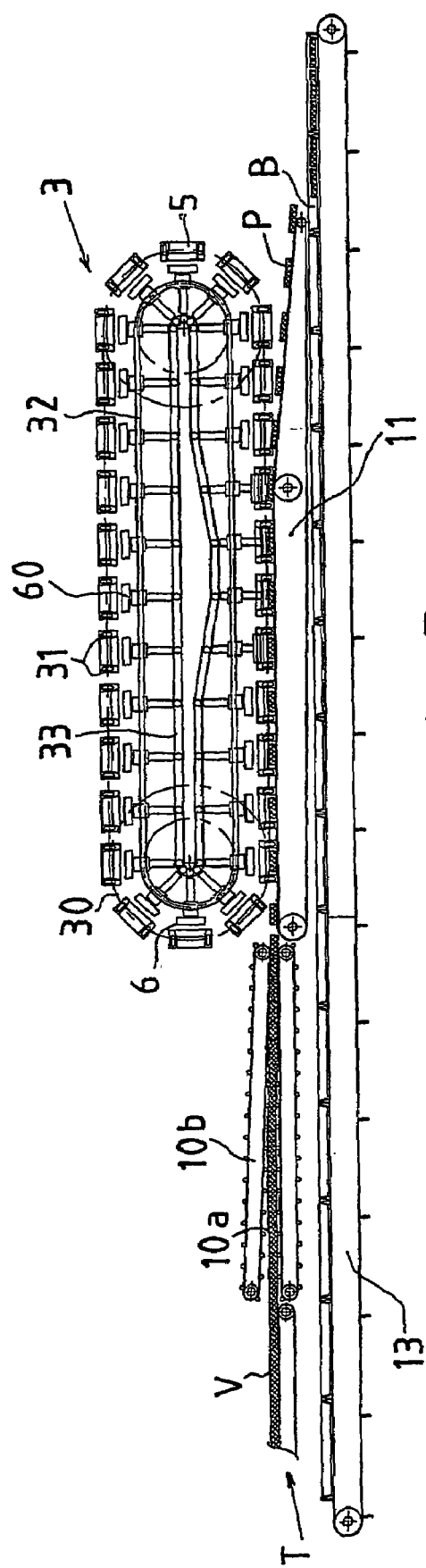
FIG. 3 is a diagrammatic side view of a second form of embodiment of the device according to the invention, for producing steaks of minced meat.

The devices according to the invention are intended to be placed in alignment after the mincing machine, not shown, producing a stream of minced meat V of predefined size and having a thread structure created by the exit grid. In all the embodiments according to the invention, they comprise transporting means T for the stream of meat V, advancing them according to the output rate and consisting of a succession of endless belts including one, reference 11, on which the shaping of portions P is carried out which, afterwards, are loaded simply by gravity into packing trays B passing onto a lower conveyor belt 13.

In the first two forms of embodiments according to the invention, respectively FIGS. 1 and 2, and FIGS. 3 and 4, the transporting means for the stream of meat V comprise, upstream the shaping transporting belt 11, a section of cutting-out into portions P, consisting of two endless belts with transversal cleats 10a and 10b, superposed to define a passage contracting vertically from upstream to downstream, and synchronised in such a way that said cleats pass facing each other two by two to tighten progressively on the stream V by pinching it until it is cut.

Because of a difference between the passing speeds of the endless belts with cleats 10a and 10b, and the shaping transporting belt 11, a defined spacing is created between the portions P.

The shaping means associated with the belt 11 in the device of FIGS. 1 and 2 comprise lateral shaping blocks 5 which advance symmetrically, sliding on each side of the belt 11. The blocks 5 are made of a material such as high density polyethylene (HDPE) and mounted side by side one after the other in two identical arrangements in endless loop 2A and 2B set horizontally (meaning with the axes of their return means vertical) on both sides of the shaping transporting belt 11 with which they advance perfectly synchronised. The blocks 5 have deep indents 50 directed outwards in their respective endless loop arrangement, so that when they coincide two by two opposite each other on the belt 11 define shaping cavities together with it. These are closed along a certain length in the median part of the arrangements 2A and 2B, where their facing sides advance longitudinally and in parallel, having converged after the return means upstream and before diverging at the return means downstream. From upstream to downstream, the lateral shaping blocks 5 advancing facing each other progressively approach with a portion P, to enclose it in the cavity they will make, and then they separate again.

In co-operation with the lateral shaping blocks 5, pushers 6, shown only in FIG. 1, arrive to close said cavities from above when they are formed, then descend in them in two separate actions, first for carrying out the required compacting of portions P, and then for transferring them positively to a lower level on a transporting belt 12 following after the shaping transporting belt 11, and ensuring that they are loaded into the packing trays B.

The pushers 6 are mounted in an endless loop arrangement 2C set vertically (meaning with the return means centered horizontally) above the shaping transporting belt 11, between the endless loop arrangements 2A and 2B and synchronised with them. They comprise a pusher plate 62 at the end of a strut 61 sliding in a base 60 mounted integrally with the endless loop. The sliding movements of the strut 61 are controlled by a cam for the rollers 63 at the end of the latter, said cam consisting of a guide-way 21 following the advancing loop internally.

Figure 4:
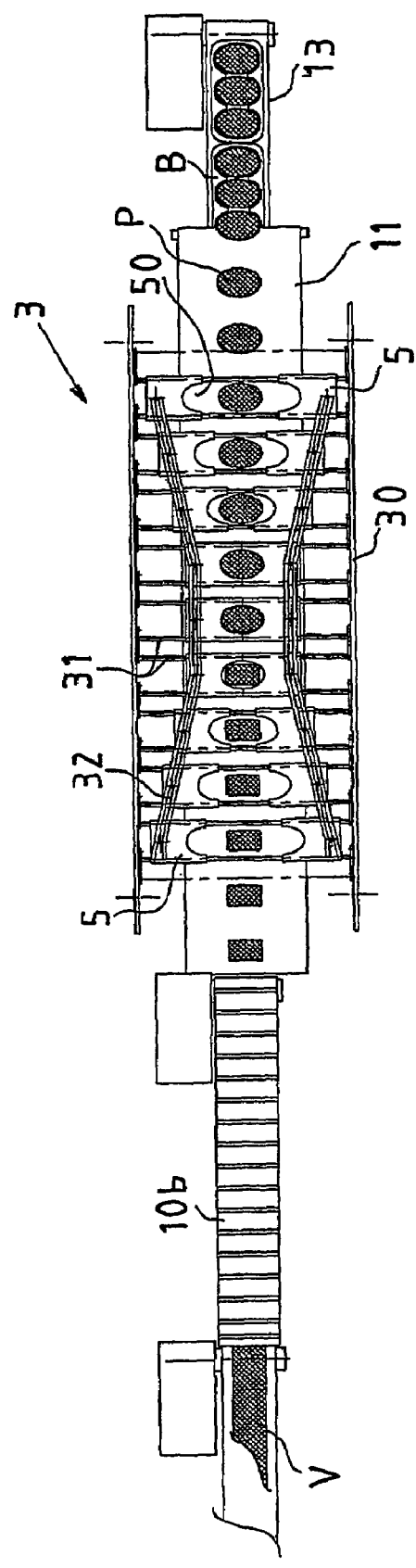
FIG. 4 is a diagrammatic top view partly representing the device of FIG. 3.
Figure 6:
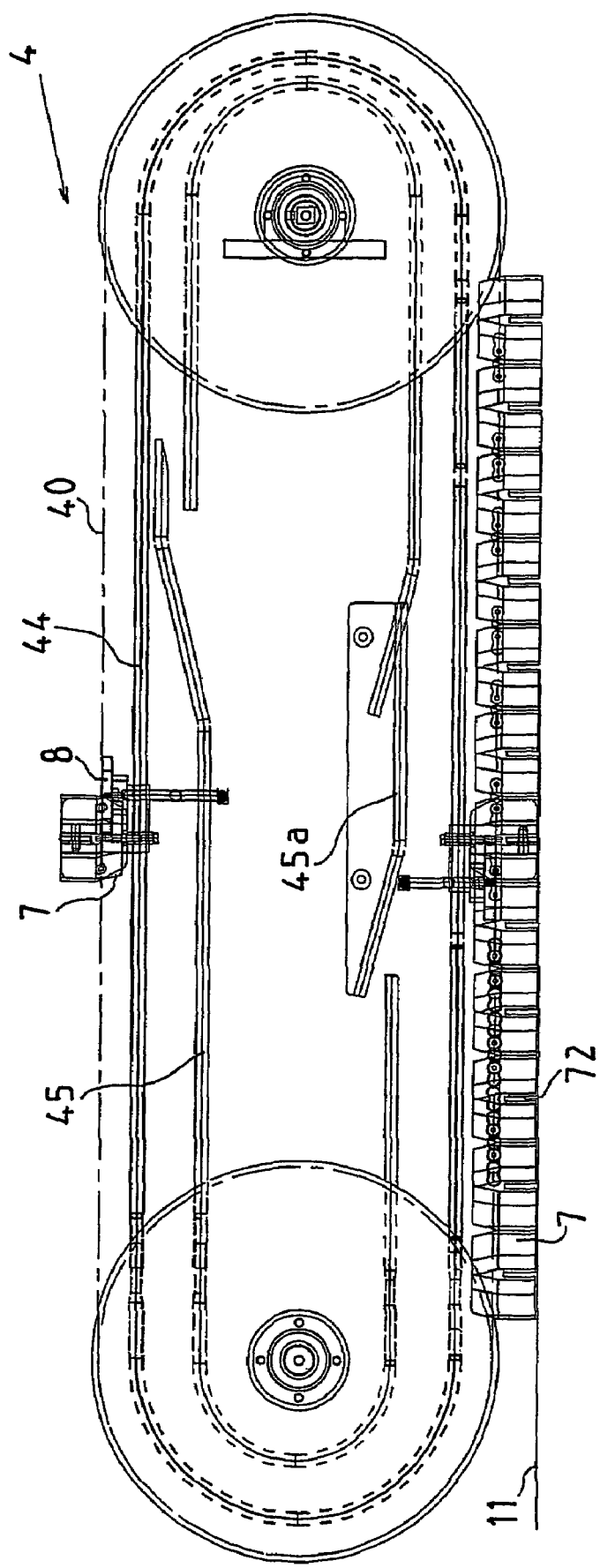
FIG. 6 is a diagrammatic side view representing, on an enlarged scale, an essential part of the device of FIG. 5.

The device in FIGS. 3 and 4 differs from the one just describe essentially through the layout of its means, but it operates in the same way. Here, the lateral shaping blocks 5 and the pushers 6 are mounted in the same endless loop arrangement 3 set vertically (meaning with its return means centered horizontally) above the shaping transporting belt 11. The endless loop arrangement 3 comprises two identical lateral endless chains in parallel 30, that carry double transversal runners 31 on which the lateral shaping blocks 5 slide two by two facing each other, their movement being controlled by lateral rails 32, as shown diagrammatically in FIG. 4. As for the pushers 6, they have a base 60 mounted on supports fixed to the runners 31 and which, for better understanding of the drawings are not shown in FIGS. 3 and 4. The pushers 6 are controlled as in the preceding example by a guide 33 following their advancing loop internally.

In this second example, the pushers 6 have a function limited to shaping the portions P. After shaping, the cavities open and free the portions P which remain in place on the shaping transporting belt 11, that carries them on its own as far as the packing trays B.

The two embodiments described above, according to their principle and in their operation, can be used for shaping the portions of meat P into shapes other than steaks, for example meatballs. It suffices to replace the lateral blocks 5 by other blocks which, instead of indents 7, are provided with recesses which, when the two blocks come face to face, form a completely closed cavity above the transporting belt 11. The pushers 6 then have no more use for shaping, and are thus superfluous.

In the preferred embodiment according to the invention shown in FIGS. 5 to 9, the cutting of the stream of minced meat V into portions P is carried out at the same time and by the same means as the shaping. As in the preceding example in FIGS. 3 and 4, this device comprises a single arrangement in an endless loop 4, mounted in the same way above the shaping transporting belt 11.

Figure 8:
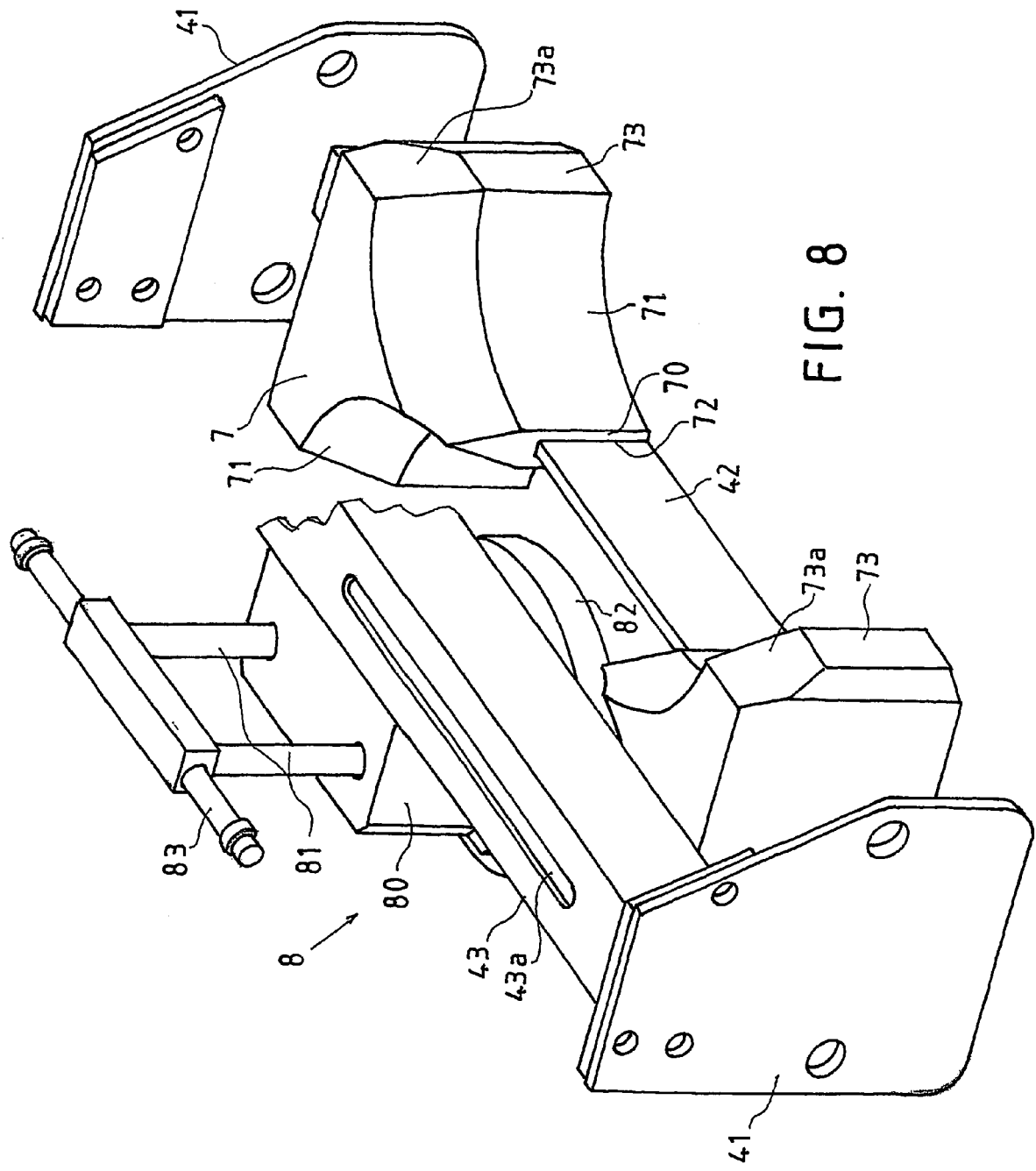
FIG. 8 is a diagrammatic view, in perspective, on an enlarged scale, representing partially and in more detail, the part of FIGS. 6 and 7 that is a shaping assembly.

The arrangement 4 comprises two identical chains 40 set in parallel, on the links of which are fixed adjacent one after the other endplates 41, as shown in FIG. 8. The endplates 41 carry two by two a shaping assembly comprising a transversal runner 42 and, above this, a transversal support beam 43. Preferably, and as shown in FIG. 8, the runners 42 are flat bars set according to their width perpendicular to the chains 40, and can be inserted and blocked in open fixation slits on the side opposite the beam 43 to allow quick mounting/dismantling.

Figure 7:
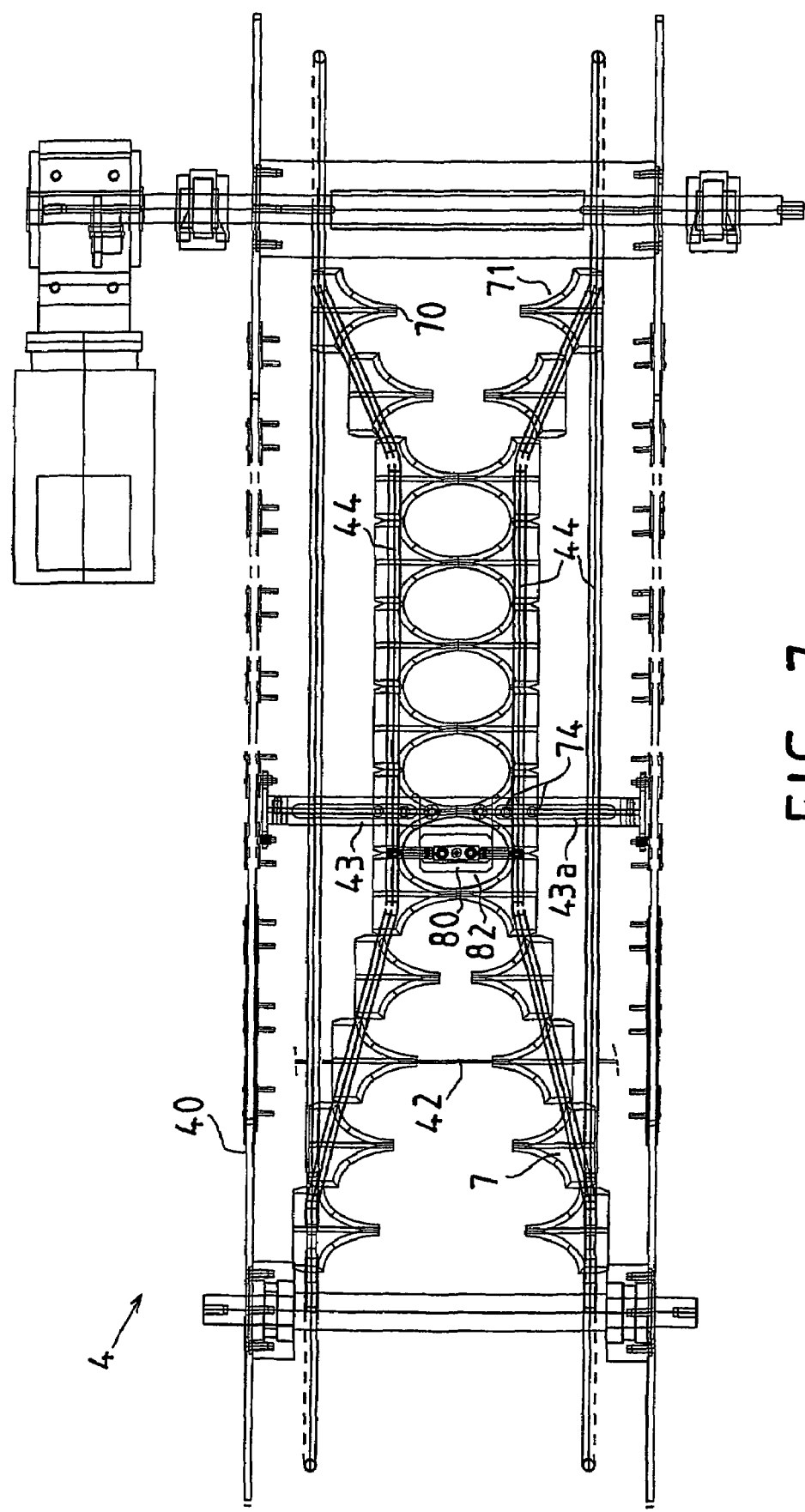
FIG. 7 is a partial diagrammatic view from above of the part of the device shown in FIG. 6.

In this case the lateral shaping blocks 7 have the particularity of being mounted sliding and straddled, opposite each other two by two, on a runner 42, by a slit 72 in their lower wall, and of being symmetrical relative to the plane of the latter. They have a median point 70 directed inwards, and edged on each side by two identical indents 71, in such a way that a shaping cavity will be formed not only by two but by four shaping blocks, meaning two successive pairs of blocks 7 facing each other. Each block 7 and its immediate neighbours on the same side are jointed so as to form cavities by vertical faces 73 before and after prolonging their indents 71 outwards, the faces 73 inclining upwards in 73a starting from a certain height to allow passage around the end returns. As in the preceding examples, the transversal movements of the blocks 7 are controlled by guide rails 44, enclosed by a pair of fingers 74 of the blocks 7 crossing a passageway slit 43a set in the beams 43, as shown in FIG. 7. The blocks 7 are held in place on their respective runner 42 by the beam 43. Their base coincides with the lower edge of the runners 42, in such a way that the latter arrive on a level with the shaping transporting belt 11 and proceed to the cutting of the minced meat stream V into portions.

Apart from ensuring the maintenance of the blocks 7 straddling their runner 42, the beams 43 act as support for the pushers 8 that have their base 80 bracket-mounted in front of or behind the latter. As in the preceding examples, the pushers 8 comprise pushing plates 82 at the end of the struts 81 sliding in the base 80, and whose distal ends, with the aid of a transversal axle 83, support rollers, not shown, co-operating with a guide-way 45 to control the movements. It is to be noted that in FIGS. 5 and 6, the segment 45a of the guide-way corresponding to the shaping section is shown as adjustable, to enable modification of the pressing run of the pushers 8 depending on requirements.

During operation, when the blocks 7 arrive in contact with the shaping transporting belt 11, together with their runner 42, the latter carries out a cut of the stream of meat V, to be completed by the facing blocks 7 when their points 70 come together.

Here, as in the first example, the pushers 8 ensure a positive transfer, after shaping, of the portions P on a band 12 whose entry is below the exit from the shaping band 11. The various operational positions of the pushers 8 are shown diagrammatically in FIGS. 9a to 9c. For example, the pushers 8 are shown in a lifted position in FIG. 9a, in a position at the end of pressing in FIG. 9b, in a position after evacuation of the portions in FIG. 9c, and upon return to the lifted position in FIG. 9d.

Figure 10:
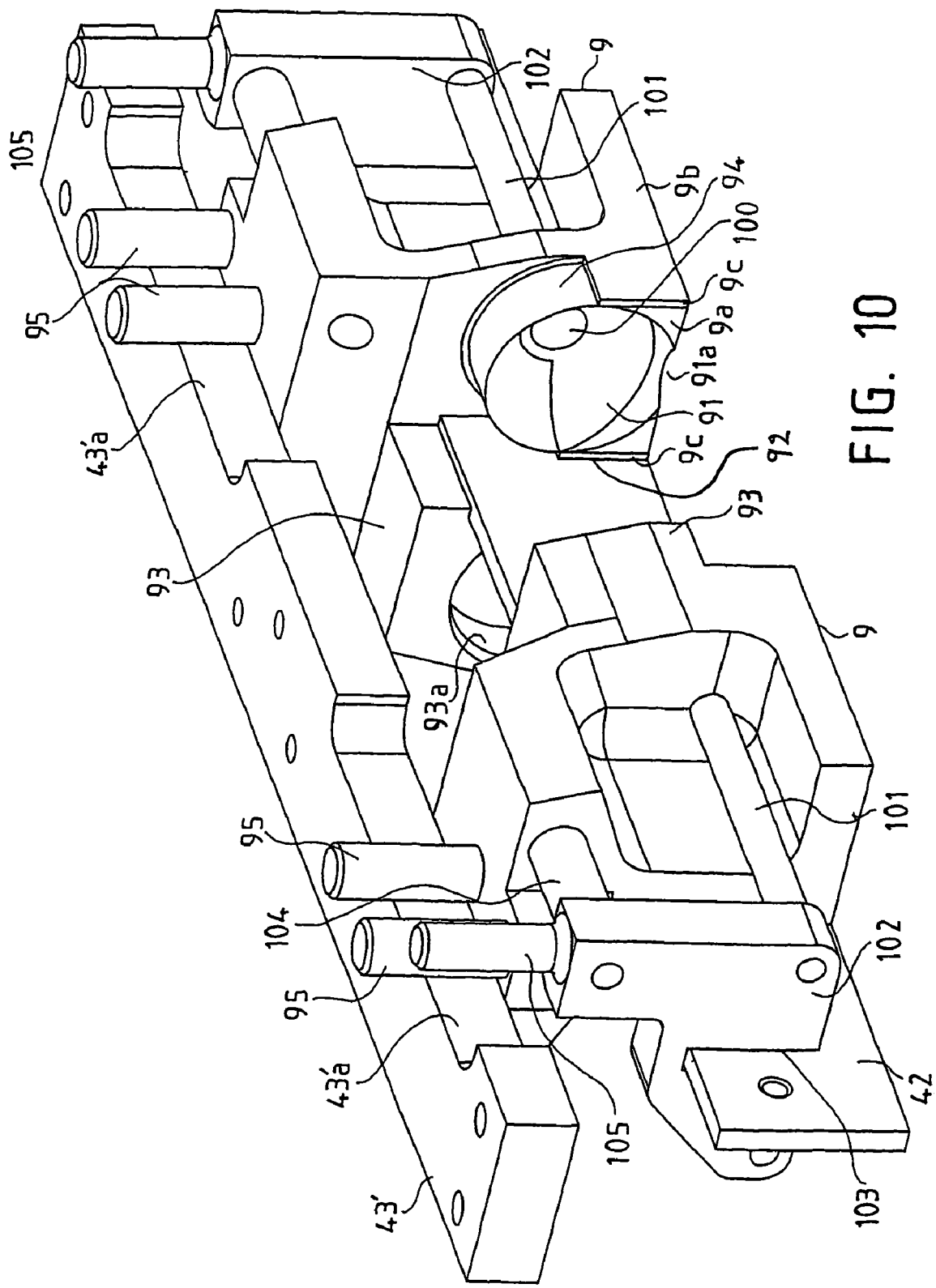
FIG. 10 is a diagrammatic view in perspective, in operational position, of a shaping assembly similar to that of FIG. 8, but intended for the production of meatballs.
Figure 11:
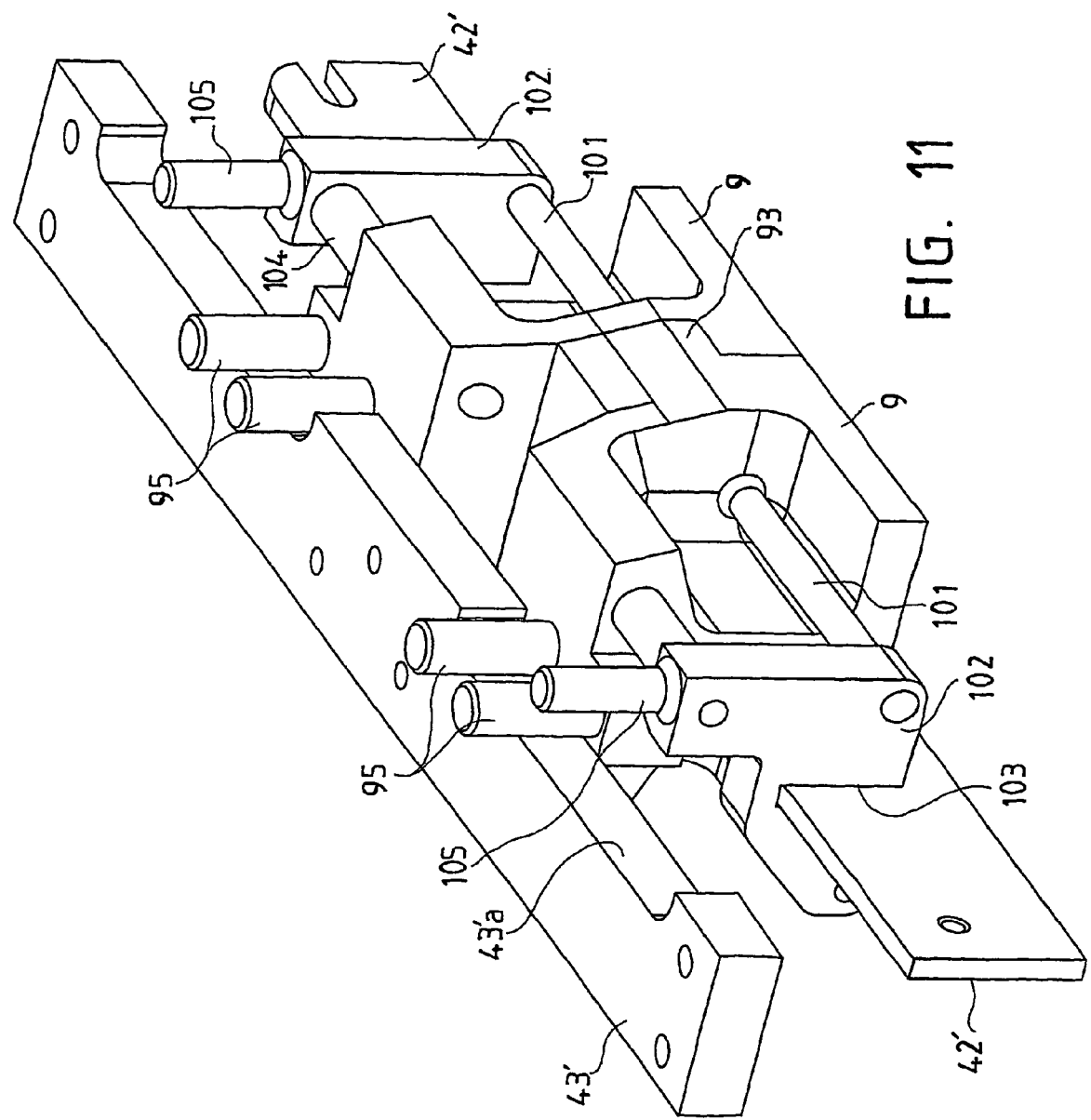
FIGS. 11 and 12 are two other diagrammatic views in perspective of the same shaping assembly as FIG. 8, respectively in two other operational positions.
Figure 12:
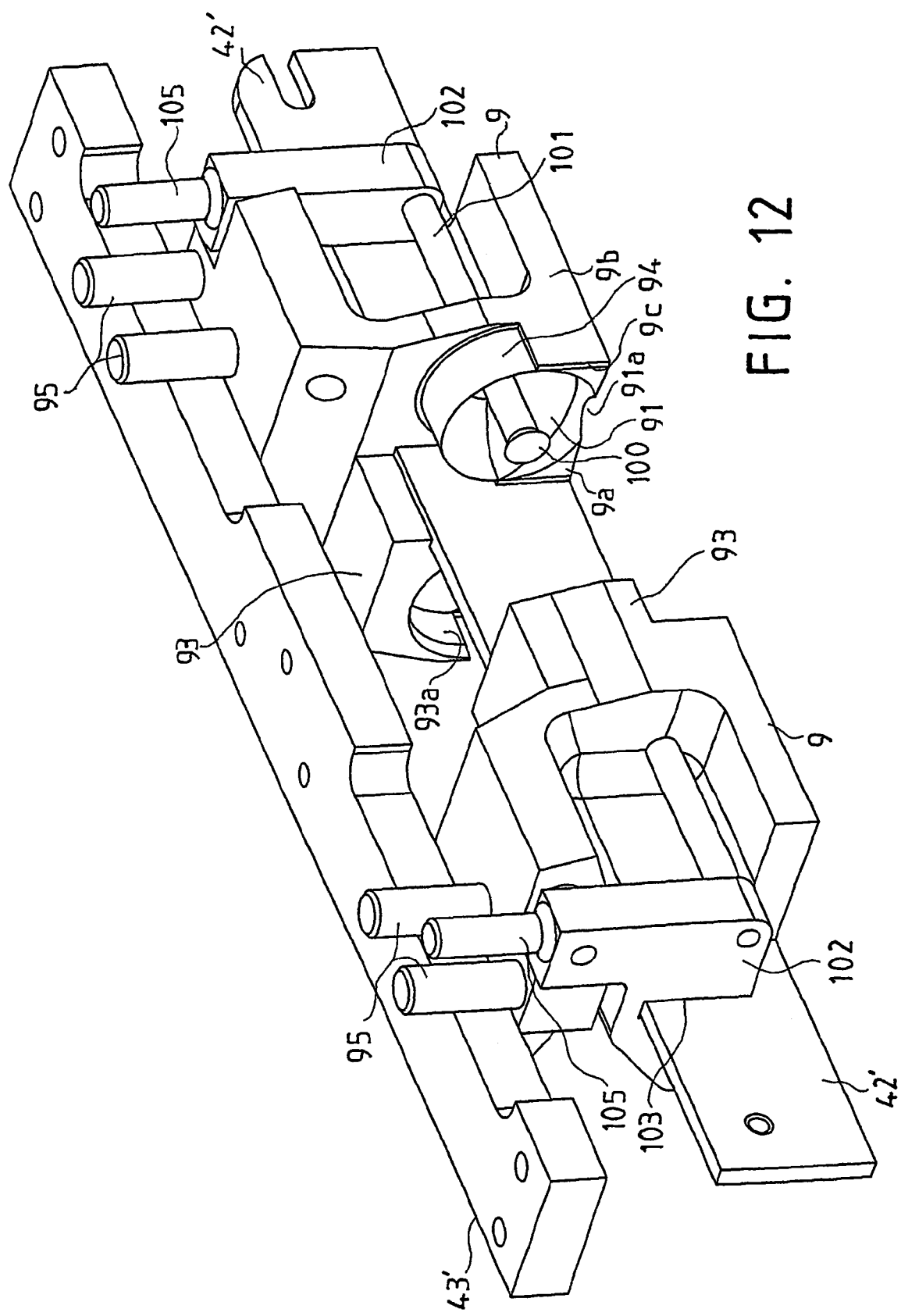

FIGS. 10 to 12 show shaping assemblies for a device of the same type as that in FIGS. 5 to 9, where the cutting of the stream of meat into portions is also ensured at the same time and by the same means as the shaping, and where a single endless loop arrangement is mounted in the same way above the shaping transporting belt. But instead of minced steaks, this device serves to produce balls of minced meat.

As in the preceding example, the single endless belt arrangement comprises two identical chains in parallel and mounting end plates, homologous respectively to the chains 40 and the end plates 41 shown in FIGS. 7 and 8, and fitted in the same way.

And a transversal runner 42' and, above it, a transversal support beam 43', are carried by each pair of end plates opposite each other, exactly in the same way as shown in FIG. 8 for the runner 42 and the beam 43.

The lateral shaping blocks 9 are mounted sliding, straddling and facing two by two on each runner 42', by means of a median slit 92 in their sliding plane lower wall on the shaping transporting belt. On both sides of the slit 92, they are double, in other words a meatball will be formed on each side of the runner 42' inserted in the slit 92. In order to achieve this, in their inward looking face 9a and on each side of the slit 92, the blocks 9 have a recess substantially hemispherical in shape 91. It can be seen that in the advancing direction, the recess 91 has a dimension or diameter such that it comes as close as possible to the plane of the slit 92 and, on the other hand, as close as possible also to the end wall 9b.

Furthermore, it can be seen in the drawing that each block 9 has, overhanging a recess 91, an overlap part 93, and above its other recess, a cut-out defining an external surface 94 complementary to the internal surface 93a of the overlap part 93, allowing interlocking with sliding contact between these two surfaces when the two blocks 9 approach each other, as shown in FIG. 11. The advantage of such a design for the blocks 9 with, in each, an overlap part 93 and, on the other side of the slit 92, a complementary cut-out part 94, is that the totality of the blocks of the device are strictly identical.

It can be seen in FIGS. 10 and 12 that the face 9a of the blocks 9 is slightly chamfered on each side of the recess 91, providing protrusion for the front and back external edges 9c at the level where contact is established between the opposite blocks. It follows that the lower half of each cavity formed when the two recesses join together remains in communication on each side with an interstitial space in which excess meat can flow without detaching from the body of the meatball to be shaped, which reduces the volume of rejects and clogging. Furthermore, it is to be noted that advantageously a slight indent 91a is formed at the level of the lower pole position of each recess 91.

The blocks 9 comprise, above, a pair of fingers 95 participating in their control when in transversal movement on the runner 42' by co-operating with a guide rail passing in the gap they define. In the example of an embodiment shown, the fingers 95 slide along the extended indents 43'a in the beam 43'.

In the same way, another finger 105 controls the movement of cups 100 constituting the base of the recesses 91 when they are in the return position of FIG. 10. The cups 100 are supported at the end of struts 101 mounted sliding in blocks 9. Unlike the cups 100, the struts 101 are integral in each block 9 with a common crosshead 102 also engaged straddling the runner 42', by a slit 103. The crossheads 102 comprise a second guide strut 104 engaged in bores provided for this purpose in the upper part of the blocks 9.

The cups 100 have the function of maintaining the shaped meatballs in a centred position when the cavities are opened, in other words when the opposing blocks 9 separate below the shaping zone, as shown in FIG. 12.

As in the preceding example, the runner 42' is advantageously provided for ensuring the cutting of the stream of meat into portions, but here it is a matter of double portions to be processed into not one but two meatballs during shaping. The division of the portions into two is ensured by the points formed by the edges 9c of successive adjacent blocks that are perfectly jointed above the transporting belt in the shaping zone.

By comparing the shaping assemblies shown respectively in FIG. 8 and FIGS. 10 to 12, it can be seen that it would be simple to design them to be easily interchangeable within a single device.

From the above, it is evident that such a device can be adapted to producing tri-dimensional shapes other than a spherical shape, shapes that can be more complex. Furthermore, the invention provides interesting possibilities even for the constitution of products that can be defined at the stage of formation of the stream of meat, produced for example with a core of stuffing, garnish or sauce.

The invention claimed is:

1. Device for producing shaped portions of minced meat, such as minced meat steaks or meatballs, characterised in that it comprises:
    a mincing machine providing a stream of minced meat, said stream of minced meat having a size determined in function of the portions to be produced;
    conveying means with an endless belt, for transporting said stream of minced meat exiting from said mincing machine;
    means for cutting said stream of minced meat into portions, and
    lateral shaping means acting simultaneously on both sides of said stream of minced meat to shape the contour of said portions.

2. Device according to claim 1, characterised in that said means for cutting into portions of said stream of minced meat are provided upstream said shaping means.

3. Device according to claim 2, characterised in that said cutting means consist of a passage for said stream of minced meat formed by two endless belts with superposed transversal cleats that approach each other vertically from upstream to downstream, in such a way that said cleats tighten progressively two by two on said stream of minced meat by pinching it until it is cut.

4. Device according to claim 1, characterised in that it furthermore comprises vertical shaping means co-operating with said lateral shaping means to give the portions the thickness required.

5. Device according to claim 1, characterised in that said lateral shaping means are indented or recessed blocks advancing symmetrically on each side and immediately above a shaping transporting belt, being part of said conveying means for said stream of minced meat that from upstream to downstream approach each other so as to touch to form shaping cavities with their indents or recesses and with said shaping transporting belt.

6. Device according to claim 4, characterised in that said vertical shaping means are pushers arriving above said shaping transporting belt, between said lateral shaping blocks, and which advance with them in a synchronised way.

7. Device according to claim 5, characterised in that said lateral shaping blocks are mounted on the first and second endless loop arrangements set horizontally and symmetrically on either side of said shaping transporting belt.

8. Device according to claim 6, characterised in that the pushers co-operating with said lateral shaping blocks are mounted on a third endless loop arrangement set above said shaping transporting belt and between said first and second endless loop arrangements, and advancing with them in a synchronised way.

9. Device according to claim 5, characterised in that said lateral shaping blocks are mounted in a same endless loop arrangement set above said shaping transporting belt, the endless loop arrangement including two identical endless chains in parallel carrying transversal runners on which said lateral shaping blocks are mounted in a sliding manner.

10. Device according to claim 9, characterised in that said pushers are also mounted in the same endless loop arrangement as said lateral shaping blocks.

11. Device according to claim 9, characterised in that said lateral shaping blocks include a slit in their lower wall by which they are mounted in a sliding manner on their respective runner, the latter being a flat bar and proceeding to the cut-off of said stream of minced meat into portions.

12. Device according to claim 11, characterised in that said lateral shaping blocks each have two indents on either side of a central point, in such a way that the shaping cavities are each formed between two consecutive pairs of lateral shaping blocks facing each other, said blocks being mounted in a sliding manner two by two opposite each other on a transversal runner.

13. Device according to claim 10, characterised in that said pushers are bracket-carried by beams each of which being mounted above a runner and fixed to it by lateral end plates that are themselves fixed to the links of two chains in parallel of an endless loop arrangement.

14. Device according to claim 13, characterised in that the pushers constituting the vertical shaping means have a supplementary run to evacuate the portions positively from said shaping cavities.

15. Device according to claim 5, characterised in that said shaping blocks comprise recesses in their internal face and a slight chamfer on the sides of each recess wherein each cavity formed when two opposite recesses come together remain communicating on each side with an interstitial space.

16. Device according to claim 11, characterised in that said shaping blocks are double, each including two recesses on each side of their sliding slit.

17. Device according to claim 16, characterised in that each block has an overlap part overhanging a recess and above its other recess, a cut-out defining an external surface complementary to the internal surface of the overlap part allowing interlocking sliding contact between these two surfaces when the two blocks approach each other face to face.

18. Device according to claim 5, characterised in that said shaping blocks include recesses wherein the base of each recess is constituted by a cup set on the end of sliding struts the said cups having the function of maintaining the formed meatballs in a centered position when the shaping cavities are opened.

* * * * *